(12) United States Patent
Schroeder

(10) Patent No.: US 7,967,684 B1
(45) Date of Patent: Jun. 28, 2011

(54) SIMPLE, CENTER-LESS UNIVERSAL JOINT

(75) Inventor: Thomas Hermann Schroeder, Beaumont, TX (US)

(73) Assignee: Thomas Hermann Schroeder, Beaumont, TX (US)

( * ) Notice: Subject to any disclaimer, the term of this patent is extended or adjusted under 35 U.S.C. 154(b) by 412 days.

(21) Appl. No.: 12/214,650

(22) Filed: Jun. 21, 2008

Related U.S. Application Data

(60) Provisional application No. 60/936,350, filed on Jun. 21, 2007.

(51) Int. Cl.
*F16D 3/00* (2006.01)
(52) U.S. Cl. ........ 464/139; 464/106; 464/125; 464/148; 464/151

(58) Field of Classification Search ................... 464/106, 464/110, 125, 136, 139, 147, 148, 150, 151
See application file for complete search history.

(56) References Cited

U.S. PATENT DOCUMENTS

| | | | | | |
|---|---|---|---|---|---|
| 1,287,778 | A | * | 12/1918 | Sponsel | 464/139 |
| 1,358,221 | A | * | 11/1920 | Leppert | 464/139 |
| 2,879,651 | A | * | 3/1959 | Leto | 464/139 |
| 4,840,601 | A | * | 6/1989 | Denman | 464/106 |
| 4,968,173 | A | | 11/1990 | Fujita | |
| 7,084,337 | B1 | | 8/2006 | Schroeder | |

* cited by examiner

*Primary Examiner* — Greg Binda
*Assistant Examiner* — Josh Skroupa

(57) ABSTRACT

A simple, center-less universal joint of ultra tight tolerance comprising two yokes, each having two facing, distinctly round interface surface areas; both yokes being easily engaged (a self aligning process) and disengaged.

18 Claims, 10 Drawing Sheets

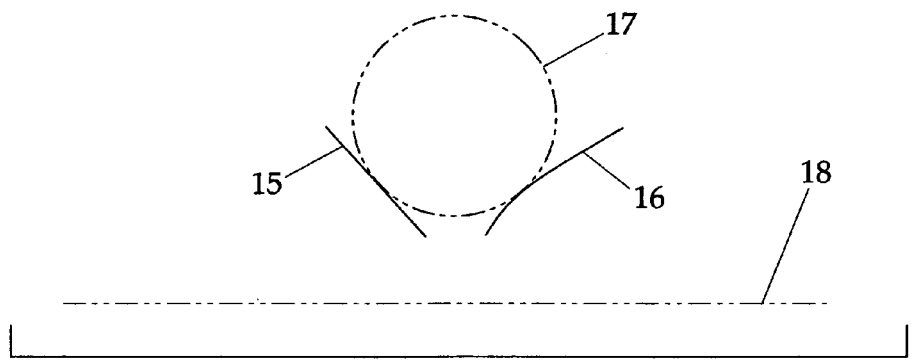
Fig. 5
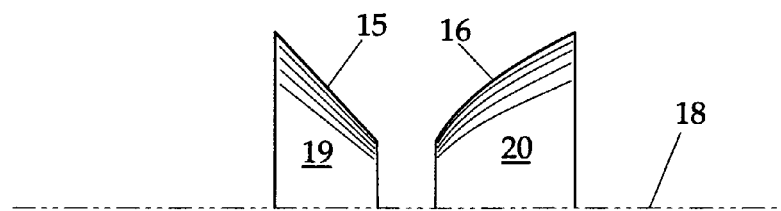
Fig. 6
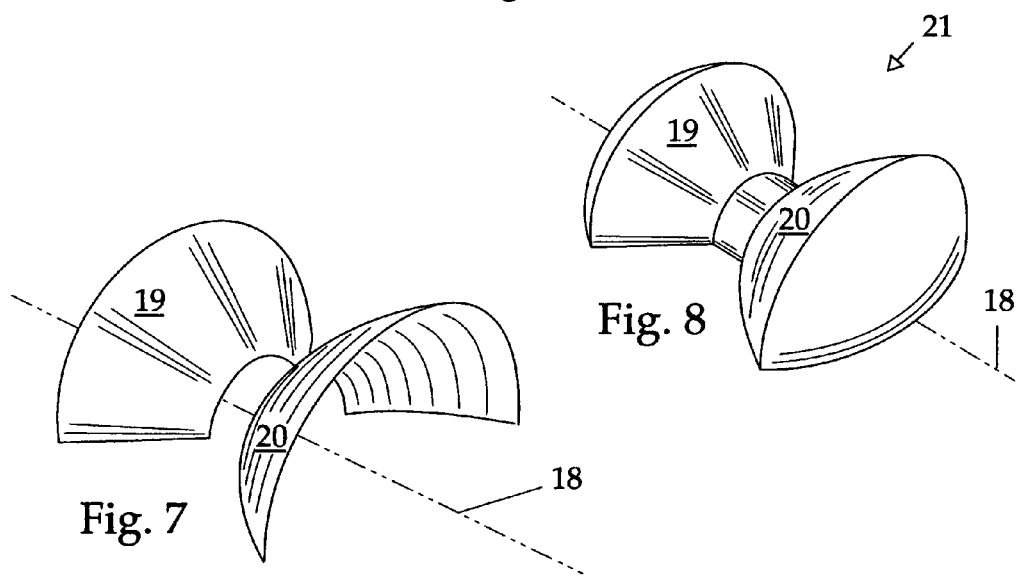
Fig. 7
Fig. 8

Fig. 16
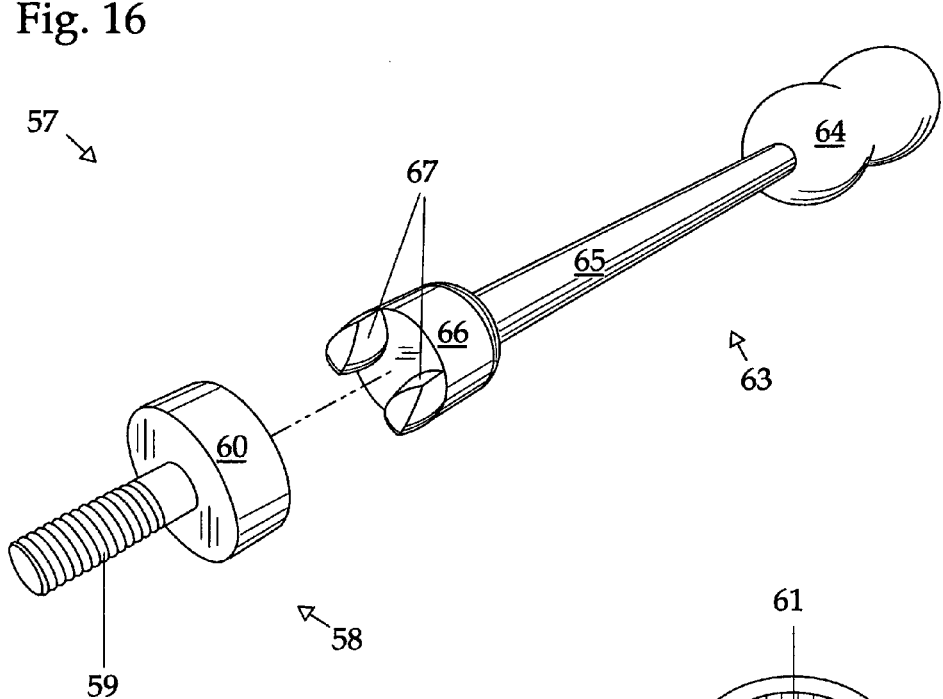
Fig. 17
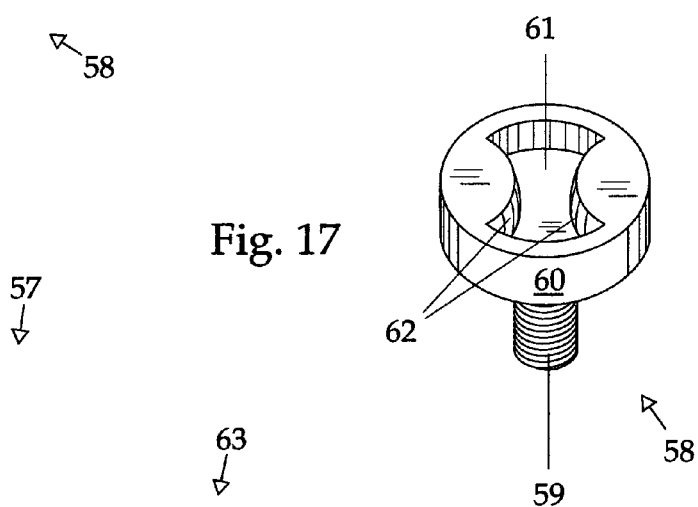
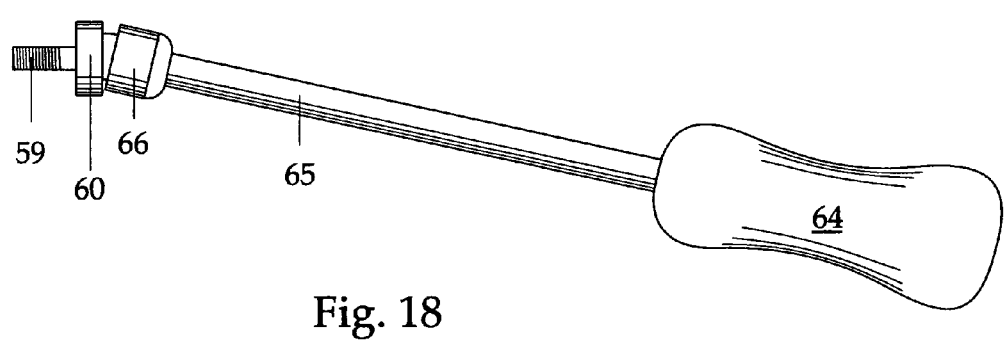
Fig. 18

SIMPLE, CENTER-LESS UNIVERSAL JOINT

CROSS-REFERENCE TO RELATED APPLICATIONS

This application claims the benefit of PPA Ser. No. 60/936, 350, Return Receipt Nr. 7006 2760 0003 6446 5318, filed Jun. 21, 2007 by Thomas Hermann Schroeder, which is incorporated by reference.

BACKGROUND

1. Field of Invention

The present invention relates to a universal joint.

2. Prior Art

Universal joints are commonly used to transmit rotational motion between two shafts, both being coplanar; they commonly consist of two shafts, each having a yoke, mounted rotatably and perpendicularly to a centerpiece. The universal joint thus uses two connections, each being a hinge joint.

Gimbal joints are commonly used to allow certain degrees of motion freedom, having one side stationary and the other movable; they commonly consist of 3 concentric rings of different diameter, mounted rotatably and perpendicularly. The intermediate ring functions as the centerpiece being connected to the inner and outer ring. Thus the gimbal joint also uses two connections, each being a hinge joint.

Both, the universal joint and gimbal joint, are closely related, such that the improvements of this patent are relevant for both structures. The use of the term universal joint from hereon should be viewed as inclusive in regard to the gimbal joint.

The universal joint commonly uses bearings such as pin bearings, roller bearings, ball bearings, or friction bearings to facilitate rotation. All these can be made using different degrees of tolerance. However, greater precision usually requires greater expense. The number of connections in a complex joint is negatively correlated to the degree of precision, each connection reducing precision. A center-less universal joint would reduce the number of connections to a single one, a direct interface between the two yokes.

U.S. Pat. No. 7,084,337 to Schroeder (2003) uses a universal joint to allow motion of a musical instrument while restricting rotation of such instrument around its longitudinal axis. The degree of precision while moving the instrument is highly important and it would thus be beneficial to have a universal joint of ultra tight tolerance, yet simple enough to allow inexpensive manufacturing.

Since the musical instrument interfaces with a support, this being a single connection, it would be of advantage to have a two part universal joint that can be easily engaged and disengaged, wherein one part would be attached to the support and the other to the instrument. Engaging the instrument-support interface would engage the universal joint interface. This engagement process should be easy; the instrument should align itself with the support such that the rotational axes of the universal joint are aligned perpendicularly. In the same manner the disengagement should be made simple allowing the player to easily release the instrument from the support. A further requirement of the joint in combination with a musical instrument would be safety; all protruding parts should have smooth surfaces. This is especially important if the player is a child. The weight of the instrument in addition to the forces applied by the player further require the joint to be durable.

U.S. Pat. No. 4,968,173 to Fujita (1990) shows a universal joint that can be disengaged as well as engaged by sliding a first yoke onto a spherical center piece connected to a second yoke. Fitting the spherical section on the yoke to the spherical center piece requires high precision to achieve smooth operation. This solution would thus not combine ultra tight tolerance and low cost.

The parts of most universal joints are not easily assembled or disassembled; thus these joints are often used as modules fitted with additional connectors to serve applications which require an easy interface for rapid connection and release.

Awnings use universal joints to allow the user to operate the crank shaft from different angles. The interface between crank and awning is often quite difficult to establish having to align the crank shaft to be collinear with the shaft of the awning's universal joint; in addition the rotational orientation of the crank shaft has to match that of the universal joint to allow the usual snap-in connection. A more usable system would be preferable.

Screwdrivers are usually used applying force against a screw while rotating the screw with the screw driver. Both screw and driver are designed to be used with collinear rotational axes. Universal joint modules can be used to allow non collinear operation, but they add to the instability of the system due to the increased number of non-weld connections. It would be beneficial to have an improved interface between screw and screwdriver that integrates the functionality of a universal joint. While wobble hex bits allow non-collinear operation, the design of the interface between driver and screw is biased towards collinear operation; thus this design is not a universal joint.

OBJECTS AND ADVANTAGES

Accordingly, several objects and advantages of the present invention are to provide a universal joint:
  (a) that is of simple design
  (b) that is of durable construction
  (c) that is inexpensive to manufacture
  (d) that has ultra tight tolerance
  (e) that is center-less
  (f) that has an easily engaging interface
  (g) that has an easily disengaging interface
  (h) that is self aligning in two ways during the engagement process, having rotational axes perpendicular as well as having shafts coplanar
  (i) that is user friendly and safe Further objects and advantages will be made clear by the following description and drawings.

SUMMARY

A simple, center-less universal joint of ultra tight tolerance comprising two yokes, each having two facing, distinctly round interface surface areas; both yokes being easily engaged (a self aligning process) and disengaged.

DRAWINGS

Figures

FIG. 5 is side view of coplanar lines illustrating the concept of a sweep used to create the first part of a second embodiment of the simple, center-less universal joint.

FIG. 6 is a side view of the completed sweep.

FIG. 7 is a perspective view of FIG. 6, showing the sweep having a 180 degree arc angle.

FIG. 8 is a perspective view showing the sweep as part of the complete first part of the second embodiment.

FIG. 16 is a perspective exploded view of a seventh embodiment of the simple, center-less universal joint showing a screw and screwdriver.

FIG. 17 is a perspective view of the screw of the seventh embodiment.

FIG. 18 is a side orthogonal view of the screwdriver of the seventh embodiment interfaced with the screw of the seventh embodiment.

DRAWINGS

Figure 1:
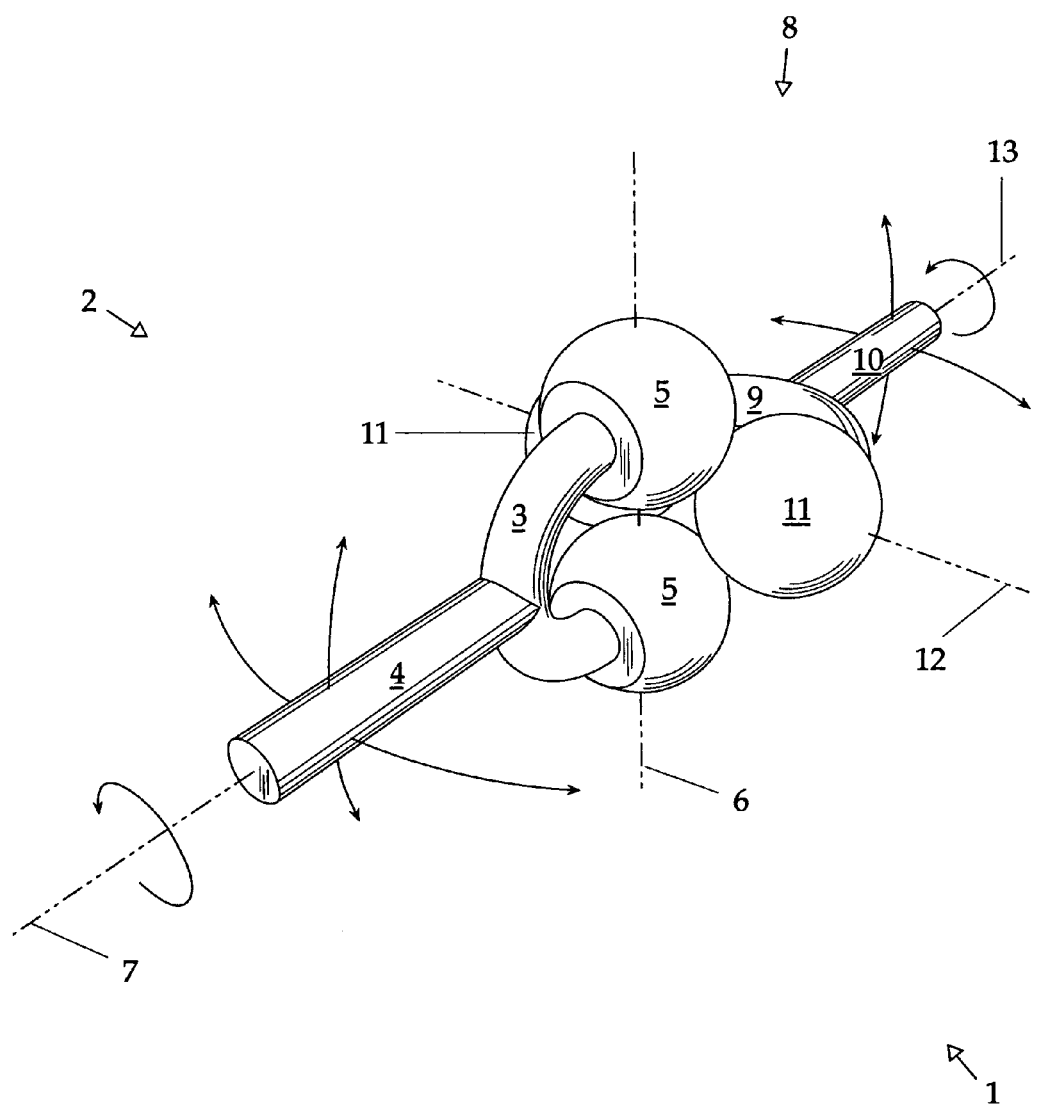
FIG. 1 is a perspective view of a first embodiment of the simple, center-less universal joint showing two yokes, each fitted with two ball knobs.

Reference Numerals 1. first embodiment of the simple, center-less universal joint
2. first structure of first embodiment 1
3. first yoke of first structure 2
4. first shaft of first structure 2
5. first two ball knobs
6. rotational first primary axis
7. rotational first secondary axis
8. second structure of first embodiment 1
9. second yoke of second structure 8
10. second shaft of second structure 8
11. second two ball knobs
12. rotational second primary axis
13. rotational second secondary axis
14. two bores of first ball knobs 5
15. linear Bézier curve
16. non-linear Bézier curve
17. circle
18. rotational axis for sweep
19. first sweep surface area
20. second sweep surface area
21. first structure of second embodiment of the simple, center-less universal joint
22. third embodiment of the simple, center-less universal joint
23. first structure of third embodiment 22
24. second structure of third embodiment 22
25. track
26. first surface area of track 25
27. second surface area of track 25
28. centerline of track 25
29. shaft of second structure 24
30. yoke of second structure 24
31. two ball knobs of second structure 24
32. fourth embodiment of the simple, center-less universal joint
33. first yoked shaft of fourth embodiment 32
34. second yoked shaft of fourth embodiment 32
35. first two ball segments of first shaft 33
36. second two ball segments of second shaft 34
37. fifth embodiment of the simple, center-less universal joint
38. first structure of fifth embodiment 37
39. second structure of fifth embodiment 37
40. musical instrument
41. two ball knobs connected to musical instrument 40
42. double cone of first structure 38
43. support rod of first structure 38
44. stool
45. rotational first axis of fifth embodiment 37
46. rotational second axis fifth embodiment 37
47. two facing surface areas of double cone 42
48. sixth embodiment of the simple, center-less universal joint
49. first structure of sixth embodiment 48
50. shaft of first structure 49
51. ring of first structure 49
52. first two facing surface areas of ring 51
53. second structure of sixth embodiment 48
54. shaft of second structure 53
55. hook of second structure 53
56. second two facing surface areas of hook 55
57. seventh embodiment of the simple, center-less universal joint
58. first structure of seventh embodiment 57, screw
59. thread of first structure 58
60. first head of first structure 58
61. slot in first head 60
62. first two facing spherical surfaces of first head 60
63. second structure of seventh embodiment 57, screwdriver
64. handle of second structure 63
65. shaft of second structure 63
66. second head of second structure 63
67. second two facing spherical surfaces of second head 66
68. eighth embodiment of the simple, center-less universal joint
69. first structure of eighth embodiment 68
70. first yoke of first structure 68
71. first two protrusions of first yoke 70
72. first two spherical segments of first yoke 70
73. two slots of spherical segments 72
74. first two facing spherical surfaces of spherical segments 72
75. second structure of eighth embodiment 68
76. second yoke of second structure 75
77. second two protrusions of second yoke 76
78. second two spherical segments of second yoke 76
79. second two facing spherical surfaces of spherical segments 78
80. rotational chain system
81. first unit of rotational chain system 80

82. second unit of rotational chain system 80
83. third unit of rotational chain system 80
84. pipe

DETAILED DESCRIPTION—FIRST EMBODIMENT

Figure 2:
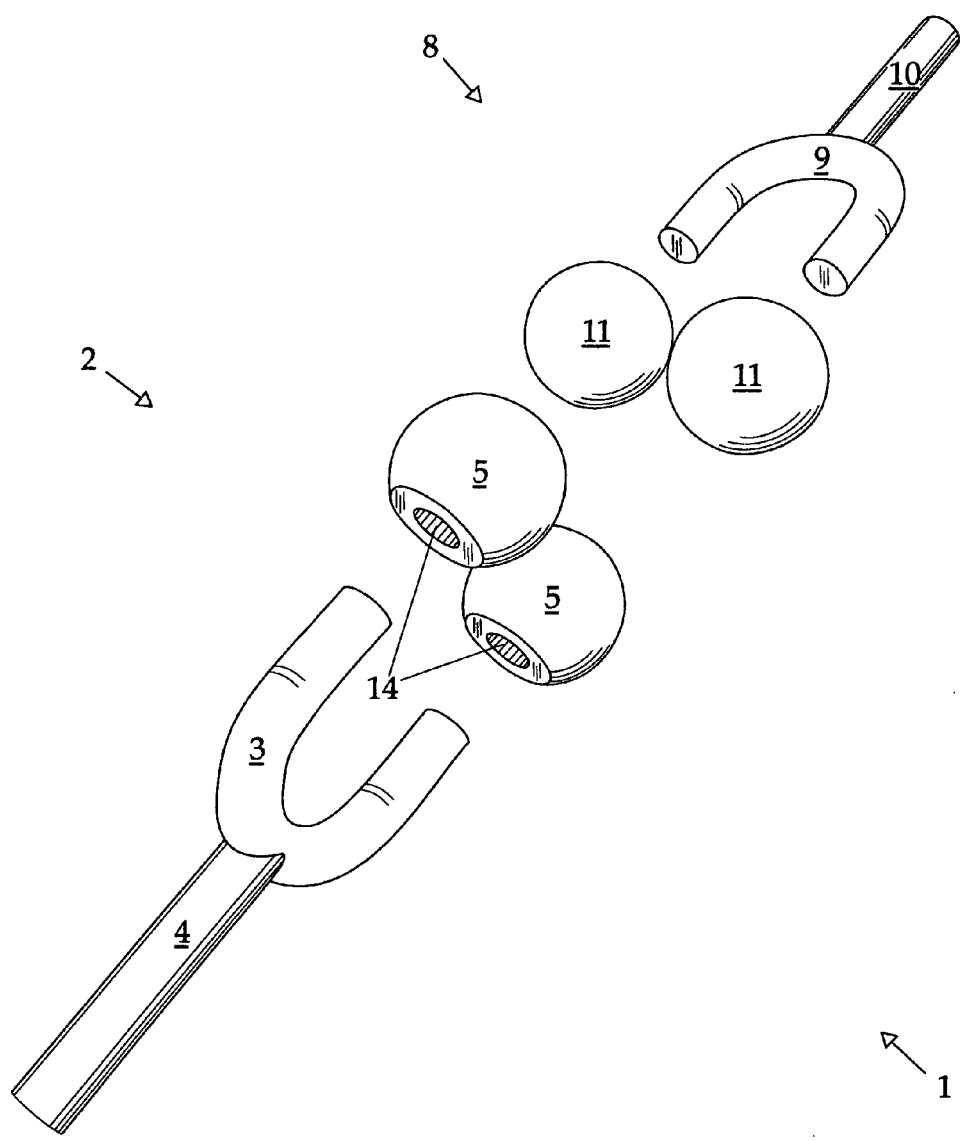
FIG. 2 is an exploded, perspective view of FIG. 1.

FIGS. 1-4 show a first embodiment 1 of the simple, center-less universal joint, having a first structure 2 and a second structure 8, both being identical. First structure 2 comprises a first shaft 4 attached to a first yoke 3 having first two ball knobs 5 securely mounted to it; second structure 8 comprises a second shaft 10 attached to a second yoke 9 having second two ball knobs 11 securely mounted to it. FIG. 2 in particular shows two bores 14 of first two ball knobs 5 for mounting onto first yoke 3; second two ball knobs 11 are mounted similarly onto second yoke 9.

FIG. 1 illustrates a rotational first primary axis 6 defined by the centers of the first two ball knobs 5; a rotational first secondary axis 7 is identical to the rotational axis of first shaft 4; both, rotational first primary axis 6 and rotational first secondary axis 7 are perpendicular. FIG. 1 also illustrates a rotational second primary axis 12 defined by the centers of second two ball knobs 11; a rotational second secondary axis 13 is identical to the rotational axis of second shaft 10; both, rotational second primary axis 12 and rotational second secondary axis 13 are perpendicular but not coplanar.

Figure 3:
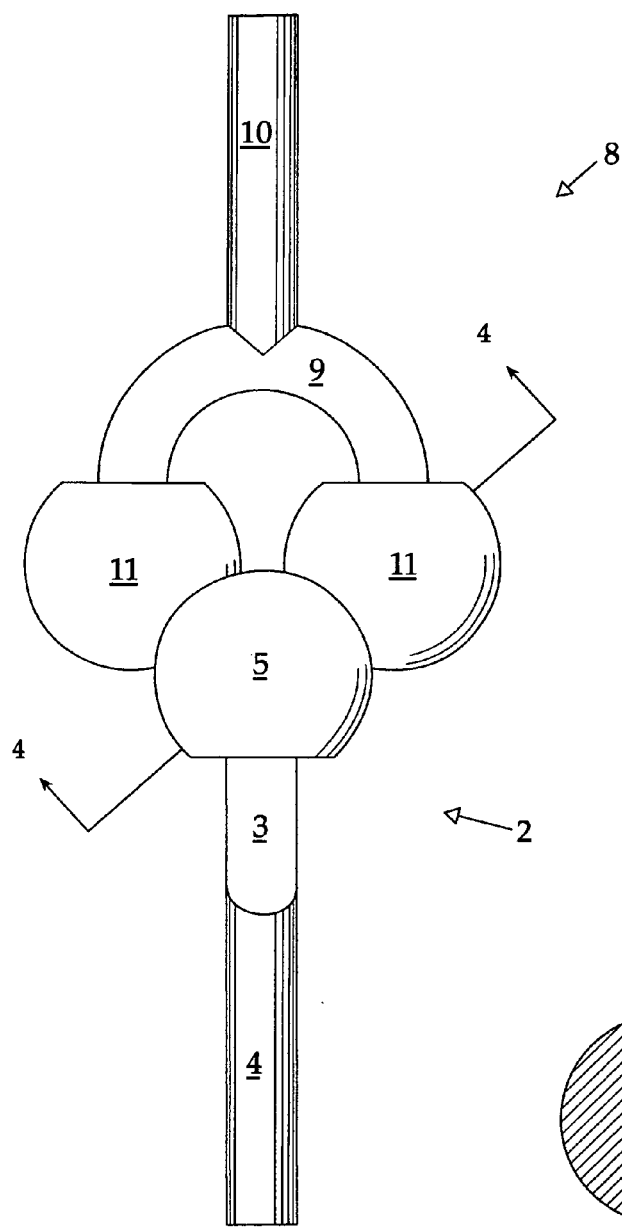
FIG. 3 is a top, orthogonal view of FIG. 1.
Figure 4:
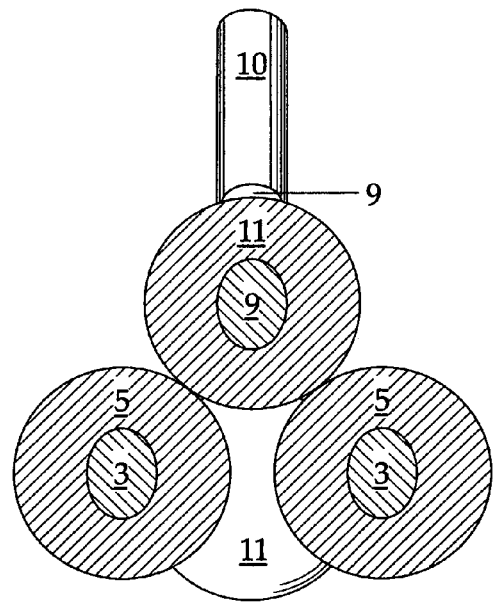
FIG. 4 is a sectional view of FIG. 3.

First structure 2 is interfaced by means of force, for example gravity, with second structure 8 such that first two ball knobs 5 touch second two ball knobs 11. FIGS. 3 and 4 illustrate the interface between first two ball knobs 5 and second two ball knobs 11. Each of first two ball knobs 5 touches each of second two ball knobs 11 in one point; each of second two ball knobs 11 touches each of first two ball knobs 5 in one point. Thus there are exactly 4 points of contact.

The process of engaging the interface between first structure 2 and second structure 8 is self aligning in that rotational first primary axis 6 and rotational second primary axis 12 are perpendicular; this process is further self aligning in that rotational first secondary axis 7 and rotational second secondary axis 13 are coplanar and in the illustrated base position even collinear. Keeping the interface between first structure 2 and second structure 8 engaged, the following rotations can be performed:

Both first structure 2 and second structure 8 can rotate around both rotational first primary axis 6 and rotational second primary axis 12, using the gliding surfaces of the first two ball knobs 5 and second two ball knobs 11.

Rotation of first structure 2 around rotational first secondary axis 7 results in rotation of second structure 8 around rotational second secondary axis 13; rotational first secondary axis 7 and rotational second secondary axis 13 can be non-collinear during transmission of rotational motion; thus the functionality of a traditional universal joint is being described.

In case second structure 8 is stationary, the freedom of motion of first structure 2 is restricted to rotation around both rotational first primary axis 6 and rotational second primary axis 12, but not around rotational first secondary axis 7; thus the functionality of a traditional gimbal joint is being described.

There is no center piece: First structure 2 interfaces directly with second structure 8; the interface can be engaged and disengaged easily, because it is non-permanently connected by force only. Furthermore, this interface has an ultra tight tolerance being based on exactly four points of contact, which are being established by force only.

While the diameter of all ball knobs (first two ball knobs 5 and second two ball knobs 11) is shown as being identical, is not a necessity. For example, the rotational first primary axis 6, being defined by the centers of first two ball knobs 5, would retain the same functionality when using different diameters. Similarly, the distance between first two ball knobs 5 and the distance between second two ball knobs 11 is shown as being identical. Again, this is not a necessity. Limitations to these measurements are obvious from the illustrations.

All, first two ball knobs 5 and second two ball knobs 11, have a low friction surface for smooth interface operation.

The simple, center-less universal joint derives its functionality from the shape of the interface surfaces, their relative positions and orientations. The following embodiments will further define the requirements of these interface surfaces and illustrate different applications benefitting from the use of this simple, center-less universal joint.

DETAILED DESCRIPTION—SECOND EMBODIMENT

Bézier curves are used to describe smooth curves: They can describe straight lines (linear Bézier curves), arcs (curves of constant radius), as well as curves of changing radius.

FIG. 5 shows a rotational axis 18, a linear Bézier curve 15 and a non-linear Bézier curve 16, both curves being tangent to a circle 17, all four objects being coplanar. Rotational axis 18 is used for a 180 degree arc angle sweep of linear Bézier curve 15 and non-linear Bézier curve 16 creating a first sweep surface area 19 and a second sweep surface area 20 respectively, as illustrated in FIGS. 6 and 7.

Linear Bézier curve 15 and non-linear Bézier curve 16 are designed to 'cradle' circle 17 such that the described sweep creates two facing surface areas, first sweep surface area 19 and second sweep surface area 20, both surface areas functioning as the interface surface areas of first structure 21 of the second embodiment of the simple, center-less universal joint.

While the first sweep surface 19 is conical, the second sweep surface 20 is round but not spherical. It is obvious that there are many different ways of creating functional facing interface surface areas using different Bézier curves. In FIG. 1 for example, the interface surface areas of the first structure 2, being the spherical outer surfaces of first ball knobs 5, can be viewed as having been created by a sweep of two identical arcs around rotational first primary axis 6, the sweep having a 360 degree arc angle, the arcs' radius being that of first ball knobs 5.

It is further obvious that only specific areas of the spherical outer surfaces of ball knobs 5 are essential for the interface between first structure 2 and second structure 8, here referred to as facing areas.

DETAILED DESCRIPTION—ALTERNATIVE EMBODIMENTS

Figure 9:
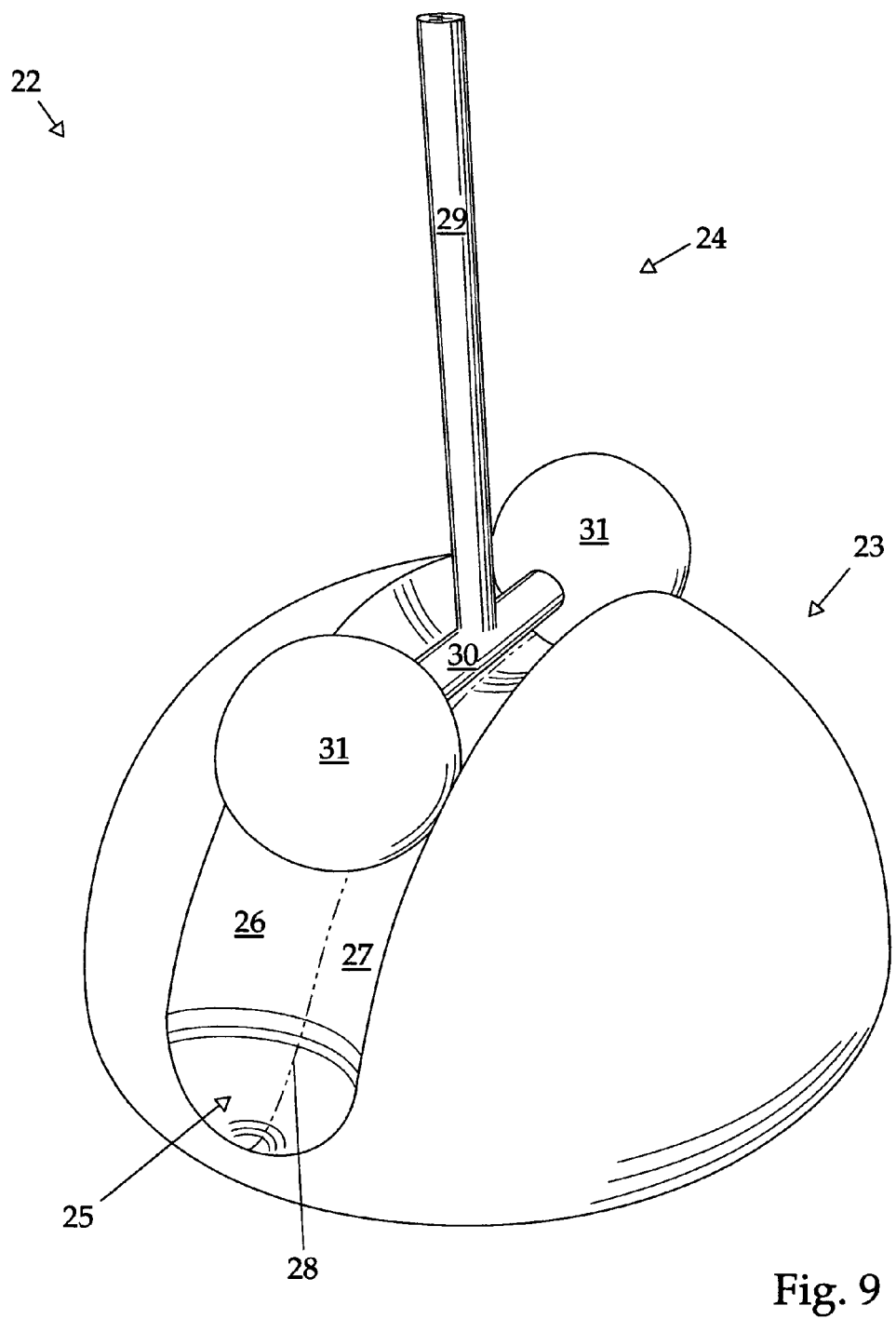
FIG. 9 is a perspective view of a third embodiment of the simple, center-less universal joint showing a base part having a track for interfacing with a yoke fitted with ball knobs.

FIG. 9 shows a third embodiment 22 of the simple, center-less universal joint. A first structure 23 serves as a stationary base having track 25, consisting of a first surface area 26 and a second surface area 27, both connected at centerline 28. A second structure 24, having a shaft 29, a yoke 30, and two ball knobs 31, interfaces with first structure 23, in particular having the two ball knobs 31 interfacing with track 25. The first surface area 26 and second surface area 27, forming track 25, can be viewed as being created by sweeps of arcs, the radius of such arcs identical to those of the two ball knobs 31. Thus this third embodiment 22 illustrates an extreme interpretation of the simple, center-less universal joint; first structure 23 interfaces with second structure 24 in more than 4 points of contact: The contact area between one of the two ball knobs 31 and track 25 is an arc.

This third embodiment 22 could be used, for example, as a stand for a double bass, having shaft 29 connected to the double bass; the stand would thus prohibit rotation of the double bass around its longitudinal axis, such axis by design being identical to shaft 29. When compared to a traditional gimbal joint, this third embodiment 22 further illustrates the simplicity of the present invention: The elimination of both centerpiece, or center ring, and bearings creates a system that is durable yet inexpensive to manufacture.

Figure 10:
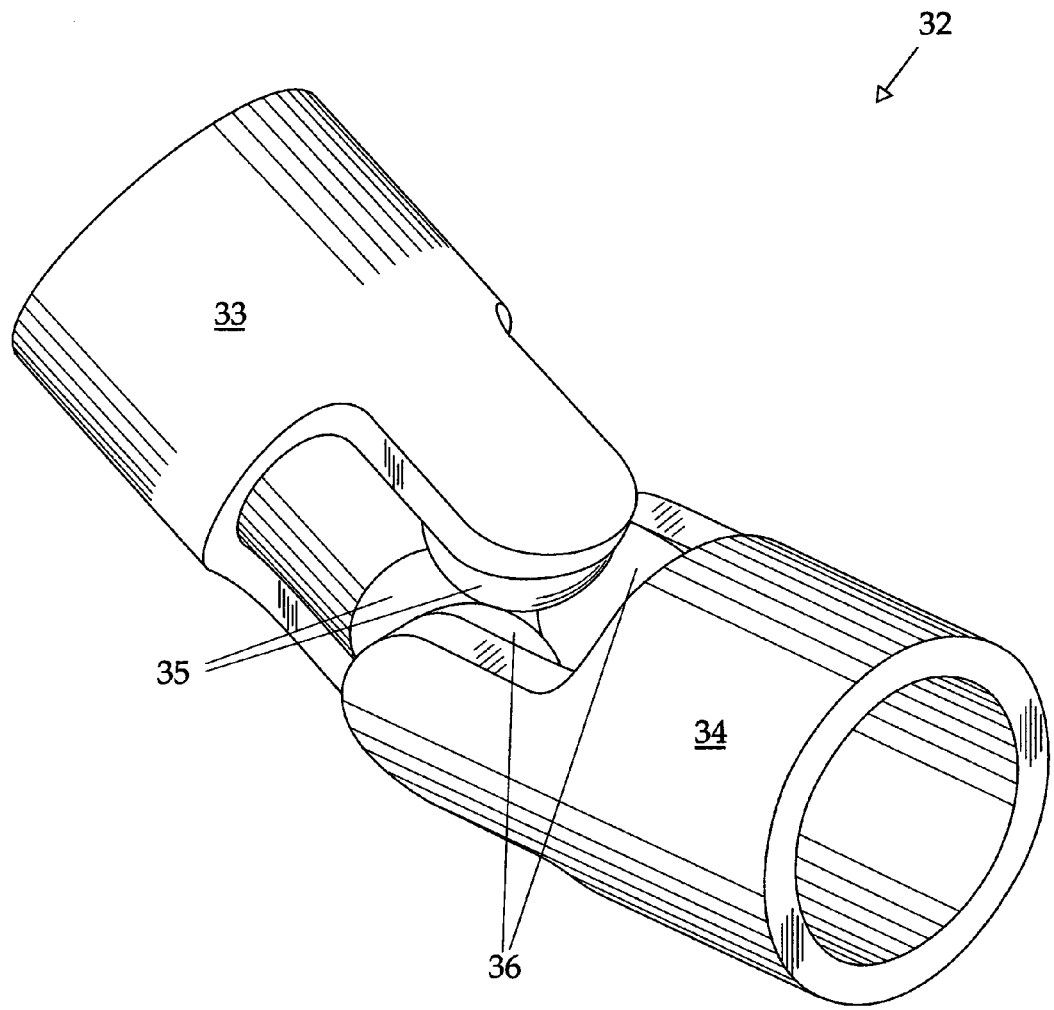
FIG. 10 is a perspective view of a fourth embodiment of the simple, center-less universal joint showing a traditional universal joint without centerpiece and bearings.

FIG. 10 shows a fourth embodiment 32 of the simple, center-less universal joint having a first yoked shaft 33, having first two ball segments 35, interfacing with a second yoked shaft 34, having second two ball segments 36. This fourth embodiment 32, while closely resembling the traditional universal joint in appearance, operates without a center piece utilizing the spherical surface areas of both first two ball segments 35 and second two ball segments 36, thus retaining the rotational functions of a traditional universal joint. First yoked shaft 33 and second yoked shaft 34 can be easily engaged, a self aligning process, and disengaged.

While first two ball segments 35 are shown as parts connected to first yoked shaft 33, they could be manufactured, molded for example, as a single unit; accordingly second two ball segments 36 and second yoked shaft 34 could be molded as a single unit. Both described single units being identical, manufacturing could be simplified to producing a single mold, no assembly required.

Figure 11:
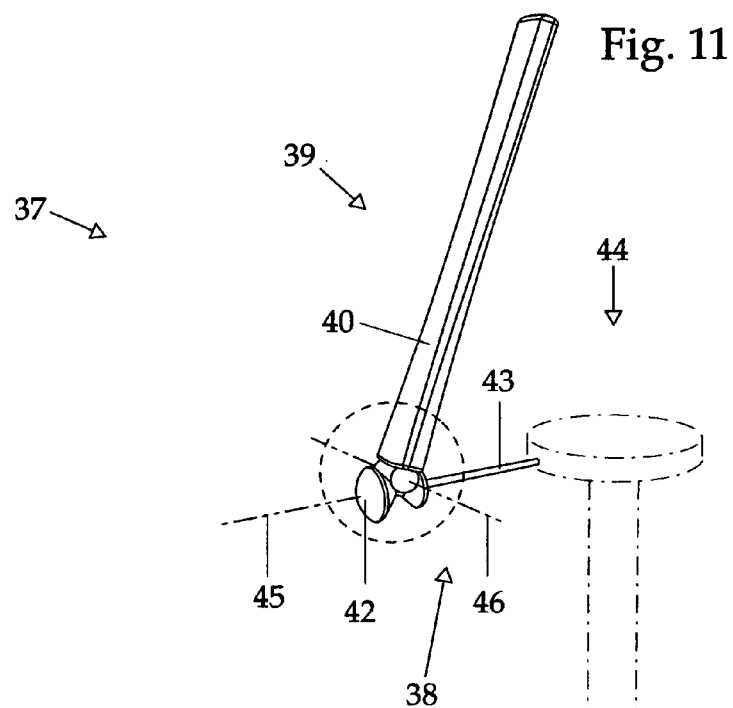
FIG. 11 is a perspective view of an ergonomic stringed instrument using a fifth embodiment of the simple, center-less universal joint.
Figure 12:
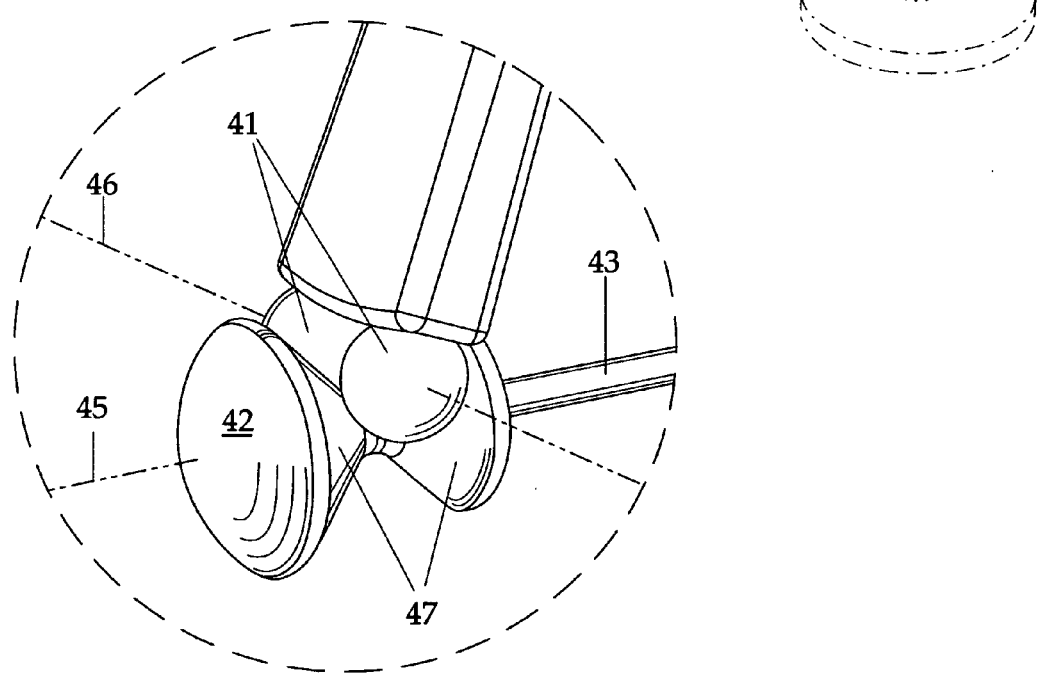
FIG. 12 is an enlarged view of FIG. 11.

FIGS. 11 and 12 show a fifth embodiment 37 of the simple, center-less universal joint. A first structure 38 having a support rod 43 and a double cone 42 is connected to a stool 44. A second structure 39, a musical instrument 40 having two ball knobs 41 connected to it, is interfacing with first structure 38, in particular having the two ball knobs 41 supported by two facing areas 47 of double cone 42.

Motion of musical instrument 40 is thus restricted to rotation around both rotational first axis 45 and rotational second axis 46. Musical instrument 40 can be easily engaged with its support, being second structure 39 connected to stool 44, as well as disengaged.

The two facing surface areas 47 of double cone 42 can be viewed as being created by a sweep of two linear Bézier curves around rotational first axis 45.

The two ball knobs 41 could alternatively be integrated at different sections of musical instrument 40, even mounted adjustably.

Figure 13:
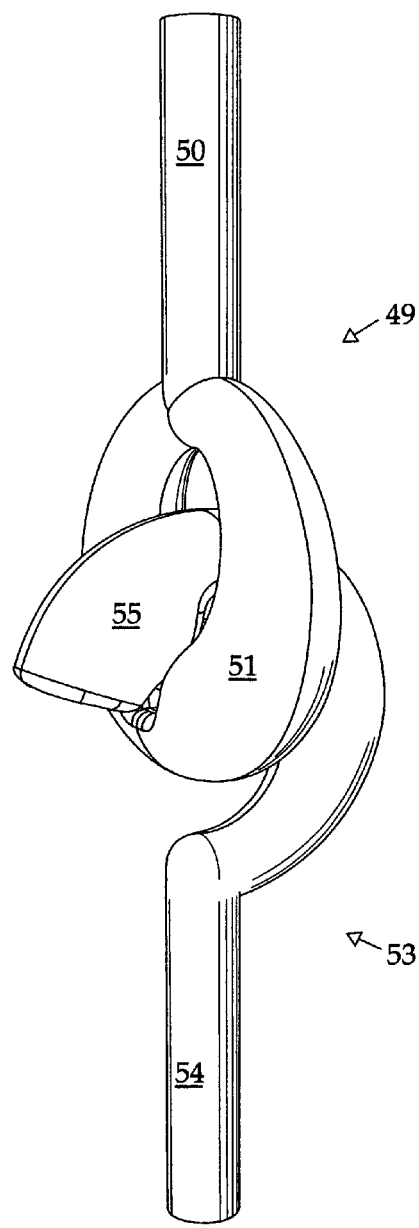
FIG. 13 is a perspective view of a sixth embodiment of the simple, center-less universal joint.
Figure 14:
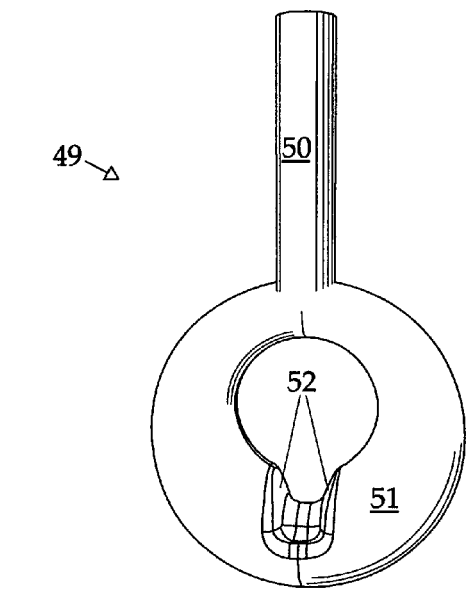
FIG. 14 is a perspective view of the first part of the sixth embodiment showing a ring shaped structure.
Figure 15:
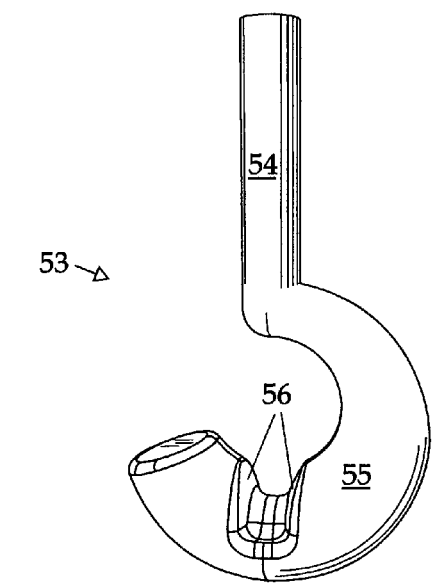
FIG. 15 is a perspective view of the second part of the sixth embodiment showing a hook shaped structure.

FIGS. 13-15 show a sixth embodiment 48 of the simple, center-less universal joint, having a first structure 49 and a second structure 53. FIG. 14 more detailed shows first structure 49 having a shaft 50 connected to a ring 51 having first two facing surface areas 52; FIG. 5 more detailed shows second structure 53 having a shaft 54 connected to a hook 55 having second two facing surface areas 56. First structure 49 can interface with second structure 53 utilizing first two facing surface areas 52 and second two facing surface areas 56.

This sixth embodiment 48 could be used in connection with an awning, particularly operation of its crank.

FIGS. 16-18 show a seventh embodiment 57 of the simple, center-less universal joint. A first structure 58, being a screw having a first head 60 and thread 59, interfaces with a second structure 63, being a screw driver having a shaft 65 connected to a handle 64 and a second head 66. First head 60 has a slot 61 exposing first two facing spherical surfaces 62, shown in FIG. 17, for interfacing with second two facing spherical surfaces 67 of second head 66.

FIG. 18 shows second structure 63 interfacing with first structure 58, the longitudinal axes of both shaft 65 and thread 59 being non collinear, while transmitting rotational motion from second structure 63 to first structure 58. This interface can be easily engaged (a self aligning process) and disengaged, because it is non-permanently connected by force only; it provides ultra tight tolerance being based on exactly four points of contact, which are established by force only.

There is no need for a traditional universal joint module to be inserted between second head 66 and shaft 65, thus retaining the stability provided by using only a single interface connection; this seventh embodiment 57 adds the benefits of a universal joint module while maintaining ultra tight tolerance.

Figure 19:
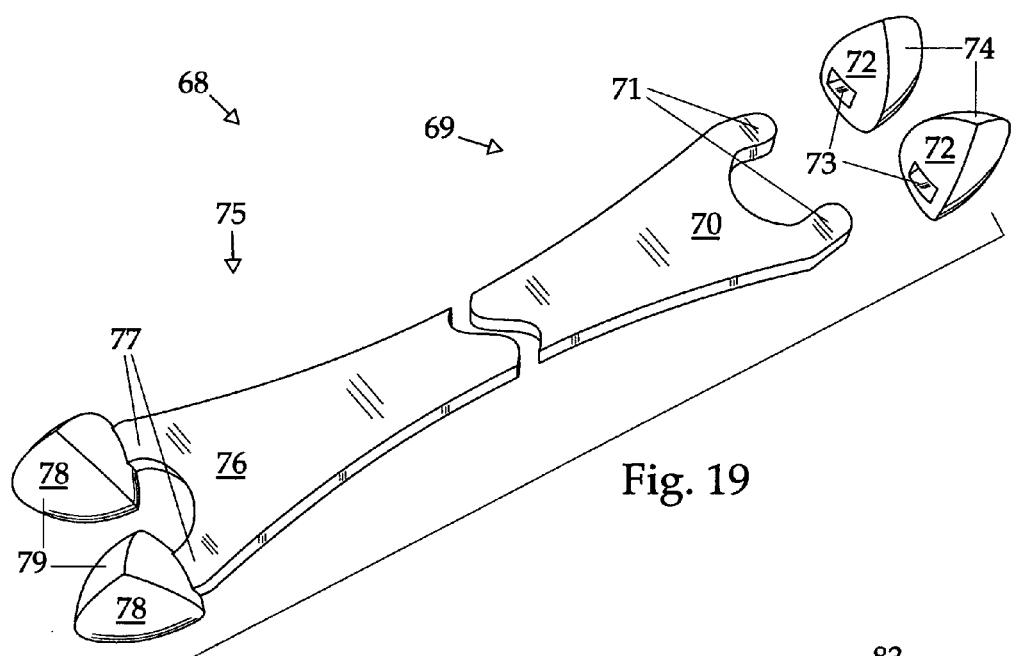
FIG. 19 is a perspective, partially exploded view of an eighth embodiment of the simple, center-less universal joint showing two yokes with spherical segments.
Figure 20:
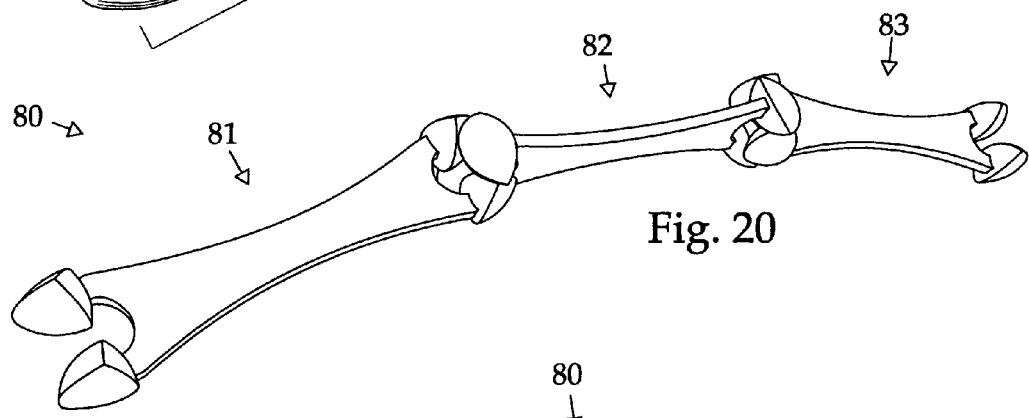
FIG. 20 is a perspective view of a rotational chain system utilizing the eighth embodiment.
Figure 21:
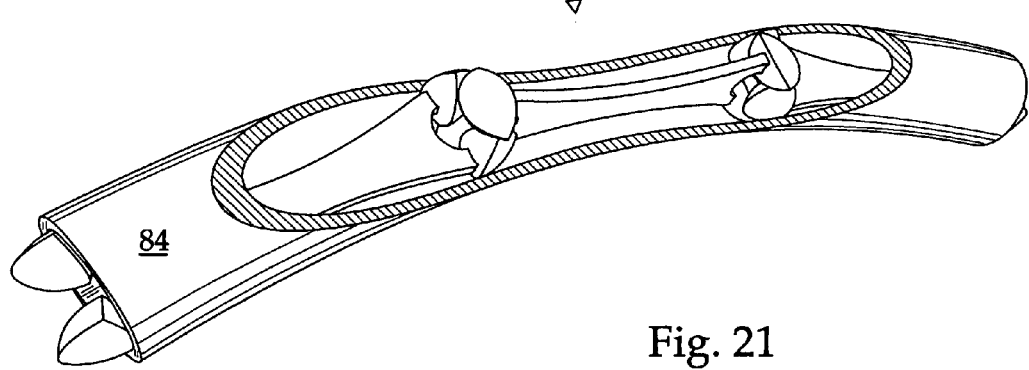
FIG. 21 is a perspective view of the rotational chain system operating in a pipe.

FIGS. 19-21 show an eighth embodiment 68 of the simple, center-less universal joint as well as application examples. A first structure 69 has a first yoke 70 with first two protrusions 71 for connecting to first two spherical segments 72 via two slots 73; accordingly, a second structure 75 has a second yoke 76 with second two protrusions 77 for connecting to second two spherical segments 78. First structure 69 can interface with second structure 75 using first two spherical segments 74 and second two spherical segments 79.

FIG. 19 also suggests a permanent connection between first structure 69 and second structure 75 forming a single unit with two yoked ends. As shown in FIG. 20, such a unit can be used to form a rotational chain system 80 having a first unit 81, second unit 82, and third unit 83 interfacing. FIG. 21 shows the rotational chain system operating within a pipe 84.

Such rotational chain systems, using any number of units, could be used, particularly due to the self-aligning interfaces, to create universal joint connections in places that are not easily accessible. Such systems would further be of ultra tight tolerance.

CONCLUSION, RAMIFICATIONS, SCOPE

While the above description contains many specificities, these should not be construed as limitations on the scope of the invention, but as exemplifications of the presently preferred embodiments thereof. Many other ramifications and variations are possible within the teachings of the invention. For example, the simple, center-less universal joint
   (a) can be made of different materials
   (b) can be made of different sizes
   (c) can have additional parts attached to it
   (d) can be integrated into other structures
   (e) can use many variations of interface surface areas
   (f) can be used in connection with all kinds of bolts and screws
   (g) can be used in connection with other applications
   (h) can be used for other musical instruments Thus the scope of the invention should be determined by the appended claims and their legal equivalent, and not by the examples given.

The invention claimed is:

1. A universal joint, comprising:
   (a) a first structure having a rotational first primary axis and rotational first secondary axis, both intersecting and being perpendicular; said first structure further having two first facing surface areas created by a sweep of two first Bézier curves around said first primary axis, said two first Bézier curves and said first primary axis being coplanar, and (b) a second structure having a rotational second primary axis and a rotational second secondary axis, both intersecting and being perpendicular; said second structure further having two second facing surface areas created by a sweep of two second Bézier curves around said second primary axis, said two second Bézier curves and second primary axis being coplanar; said first structure interfaced with said second structure by force having said first primary axis perpendicular but not coplanar to said second primary axis, having said two first facing surface areas contact said two second facing surface areas in exactly four points, and said first secondary axis and said second secondary axis being coplanar, whereby both said first structure and said second structure can each be rotated around said first primary axis and second primary axis while transmitting rotary motion between said first secondary axis and said second secondary axis, and whereby said first structure can be stationary thereby restricting the freedom of motion of said second structure to rotation around said first primary axis and said second primary axis, and whereby the interface between said first structure and said second structure is non-permanently engaged by force only, and whereby said first primary axis and said second primary axis self align perpendicularly when said first structure and said second structure are engaged, and whereby said first secondary axis and said second secondary axis self align to be coplanar when said first structure and said second structure are engaged, and whereby the interface between said first structure and said second structure consists of exactly four points of contact established by force only.

2. The universal joint of claim 1 wherein at least one of said two first Bézier curves is linear, thus defining at least one of said two first facing surface areas as being conical and collinear with said first primary axis.

3. The universal joint of claim 1 wherein at least one of said two first Bézier curves is non linear.

4. The universal joint of claim 3 wherein at least one of said two second Bézier curves is non linear.

5. The universal joint of claim 1 wherein at least one of said two first Bézier curves is an arc.

6. The universal joint of claim 5 wherein at least one of said two second Bézier curves is an arc.

7. The universal joint of claim 1 wherein at least one of said two first facing surface areas is spherical, thus specifying at least one of two first Bézier curves as an arc having a center collinear with said first primary axis.

8. The universal joint of claim 7 wherein at least one of said two second facing surface areas is spherical, thus specifying at least one of two second Bézier curves as an arc having a center collinear with said second primary axis.

9. The universal joint of claim 1 wherein said sweep of two first Bézier curves around said first primary axis has a 360 degree arc angle.

10. The universal joint of claim 9 wherein said sweep of two second Bézier curves around said second primary axis has a 360 degree arc angle.

11. The universal joint of claim 10 wherein each of said second set of two facing spherical surfaces is a ball segment.

12. The universal joint of claim 11 wherein each of said ball segments is a ball.

13. The universal joint of claim 9 wherein each of said first set of two facing spherical surfaces is a ball segment.

14. The universal joint of claim 13 wherein each of said first set of two facing spherical surfaces is a ball segment.

15. The universal joint of claim 1 wherein said first structure is part of a musical instrument support and said second structure is part of a musical instrument.

16. The universal joint of claim 1 wherein said first structure is part of a screw and said second structure is part of a screw driver.

17. A universal joint, comprising:
(a) a first yoke having a first set of two facing spherical surfaces, said first yoke further having a rotational first primary axis, defined by the two sphere centers of said first set of spherical surfaces, and an intersecting and perpendicular rotational first secondary axis,
(b) a second yoke having a second set of two facing spherical surfaces, said second yoke further having a rotational second primary axis, defined by the two sphere centers of said second set of spherical surfaces, and an intersecting and perpendicular rotational second secondary axis; said first yoke and said second yoke interfaced by force having said first primary axis perpendicular but not coplanar to said second primary axis, further having said first set of two facing spherical surfaces contact said second set of two facing spherical surfaces in exactly four points, and said first secondary axis and said second secondary axis being coplanar, whereby both said first yoke and said second yoke can each be rotated around said first primary axis and said second primary axis while transmitting rotary motion between said first secondary axis and said second secondary axis, and whereby said first yoke can be stationary thereby restricting the freedom of motion of said second yoke to said first axis and said second axis, and whereby the interface between said first yoke and said second yoke is non-permanently engaged by force only, and whereby said first primary axis and said second primary axis self align perpendicularly when said first yoke and said second yoke are engaged, and whereby the interface between said first yoke and said second yoke consists exactly four points of contact established by force only.

18. A universal joint, comprising:
(a) a first yoke having a set of two facing spherical surfaces, said first yoke further having a rotational first primary axis, defined by the two sphere centers of said set of two facing spherical surfaces, and an intersecting and perpendicular rotational first secondary axis,
(b) a second yoke having a set of two facing coaxial conical surfaces, said second yoke further having a rotational second primary axis, being the axis of said set of two facing coaxial conical surfaces, and an intersecting and perpendicular rotational second secondary axis said first yoke and said second yoke interfaced by force having said first primary axis perpendicular but not coplanar to said second primary axis, further having said set of two facing spherical surfaces contact said set of two facing coaxial conical surfaces in exactly four points, and said first secondary axis and said second secondary axis being coplanar, whereby both said first yoke and said second yoke can each be rotated around said first primary axis and said second primary axis while transmitting rotary motion between said first secondary axis and said second secondary axis, and whereby said first yoke can be stationary thereby restricting the freedom of motion of said second yoke to said first axis and said second axis, and whereby the interface between said first yoke and said second yoke is non-permanently engaged by force only, and whereby said first primary axis and said second primary axis self align perpendicularly when said first yoke and said second yoke are engaged, and whereby the interface between said first yoke and said second yoke consists of exactly four points of contact established by force only.

* * * * *